United States Patent
Oravecz (10) Patent No.: US 10,351,203 B2
(45) Date of Patent: Jul. 16, 2019

(54) FUNCTIONAL DUAL HANDLEBAR DESIGN WITH CONTROLS AND MOUNTING ARRANGEMENT

(71) Applicant: Paul Oravecz, Los Angeles, CA (US)

(72) Inventor: Paul Oravecz, Los Angeles, CA (US)

(*) Notice: Subject to any disclaimer, the term of this patent is extended or adjusted under 35 U.S.C. 154(b) by 99 days.

(21) Appl. No.: 15/612,787

(22) Filed: Aug. 4, 2017

(65) Prior Publication Data

US 2018/0072369 A1    Mar. 15, 2018

Related U.S. Application Data

(62) Division of application No. 14/458,462, filed on Aug. 13, 2014, now Pat. No. 9,708,024.

(51) Int. Cl.

| | |
|---|---|
| *B62K 21/26* | (2006.01) |
| *B62K 11/14* | (2006.01) |
| *B62K 21/16* | (2006.01) |
| *B62K 21/12* | (2006.01) |
| *B62K 11/04* | (2006.01) |
| *B63H 25/02* | (2006.01) |

(52) U.S. Cl.
CPC .............. *B62K 11/14* (2013.01); *B62K 11/04* (2013.01); *B62K 21/125* (2013.01); *B62K 21/16* (2013.01); *B63H 2025/024* (2013.01)

(58) Field of Classification Search
CPC ........ B62K 11/04; B62K 11/14; B62K 21/12; B62K 21/125; B62K 21/16; B62K 23/00; B63H 25/02; B63H 2025/024; B62D 1/12
See application file for complete search history.

(56) References Cited

U.S. PATENT DOCUMENTS

| 5,503,419 A | * | 4/1996 | Gardner | B62K 3/12 |
| | | | | 280/231 |
| 6,662,680 B2 | * | 12/2003 | Rocket | B62K 21/125 |
| | | | | 74/551.1 |
| 7,213,485 B2 | * | 5/2007 | Huang | B62K 21/125 |
| | | | | 74/551.1 |

(Continued)

*Primary Examiner* — Adam D Rogers
(74) *Attorney, Agent, or Firm* — William J. Benman; Benman, Brown & Williams (57) ABSTRACT

A vehicle control system comprising a first set of handlebar grips including a first grip mounted on a first side of the vehicle and a second grip mounted on a second side of the vehicle and a second set of handlebar grips mounted on the vehicle including a third grip mounted on the first side of the vehicle and a fourth grip mounted on the second side of the vehicle, the first and third grips being mounted in at least one position thereof in parallel, coplanar relation and the second and fourth grips being mounted in at least one position thereof in parallel, coplanar relation. In a specific embodiment, the invention further includes a first set of controls mounted on the first set of handlebars and a second set of controls mounted on the second set of handlebars. The first set of controls may be identical to the second set of controls. The second set of controls is coupled to or through the first set of handlebar controls. In a preferred embodiment, an adjustment mechanism is included with a drive motor for changing a mounting angle of the second set of handlebars relative to the first set of handlebars and a second drive motor for changing a mounting distance of the second set of handlebars relative to the first set of handlebars.

9 Claims, 8 Drawing Sheets

(56) References Cited

U.S. PATENT DOCUMENTS

| | | | |
|---|---|---|---|
| 10,173,745 B1 * | 1/2019 | Oravecz | B62K 21/16 |
| 2010/0186545 A1 * | 7/2010 | Ray | B62K 21/125 |
| | | | 74/551.8 |

* cited by examiner

FUNCTIONAL DUAL HANDLEBAR DESIGN WITH CONTROLS AND MOUNTING ARRANGEMENT

BACKGROUND OF THE INVENTION

Field of the Invention

The present invention relates to motorcycles, bicycles, snow mobiles, jet skis and other vehicles with handlebars. More specifically, the present invention relates to systems and techniques for providing a second set of handlebars for use such vehicles along with a first set of handlebars.

Description of the Related Art

It is well-known in the motorcycle community that the typically fixed position of the handlebars has numerous limitations including: 1) a suboptimal positioning of the handlebars for a rider; 2) even if optimal at one time, the fixed handlebar position can be uncomfortable for a rider on another occasion due to injury, illness, weight gain or a variety of other changes in the riders condition or mood; and/or 3) the position of the handlebars, even if comfortable at the start of a ride, can become uncomfortable over time after long hours on the road.

Accordingly, a need has existed in the art for an apparatus and method for adjusting the position of handlebars for motorcycles and other similar vehicles. While adjustable handlebars were known in the art, these systems typically required the user to adjust the handlebar positions mechanically and by hand. This was slow, cumbersome and typically provided a discrete set of position options as opposed to a continuous set of position options. Hence, a need remained in the art for an easy to use motorized system and method for adjusting motorcycle handle bars over a continuous range of motion.

The need was addressed by an invention disclosed by P. Oravecz in a copending patent application entitled SYSTEM AND METHOD FOR CONTINUOUSLY VARIABLE MOTORIZED ADJUSTMENT OF MOTORCYCLE HANDLEBARS, Ser. No. 14/171,708 filed Feb. 3, 2014, the teachings of which are incorporated herein by reference. This application discloses and claims a motorized system for adjusting the tilt angle and telescopic position of handlebars mounted on a motorcycle, bicycle or other vehicle.

While this invention substantially addresses the need in the art, unfortunately, it requires a removal of the original handlebars. However, in some motorcycles, such as sport speed bikes there is a value in retaining the original handlebars while still providing some option for adjusting the rider's position.

Hence, a need remains for a system for a system for adjusting the rider's position while still controlling the motorcycle (i.e., throttle, brake, clutch, etc.) and allowing for use of the original handlebars.

SUMMARY OF THE INVENTION

The need in the art is addressed by the system and method of the present invention. The disclosed vehicle control system comprises a first set of handlebar grips including a first grip mounted on a first side of the vehicle and a second grip mounted on a second side of the vehicle and a second set of handlebar grips mounted on the vehicle including a third grip mounted on the first side of the vehicle and a fourth grip mounted on the second side of the vehicle, the first and third grips being mounted in at least one position thereof in parallel, coplanar relation and the second and fourth grips being mounted in at least one position thereof in parallel, coplanar relation.

In a specific embodiment, the invention further includes a first set of controls mounted on the first set of handlebars and a second set of controls mounted on the second set of handlebars. The first set of controls may be identical to the second set of controls. The second set of controls is coupled to or through the first set of handlebar controls.

In a preferred embodiment, an adjustment means is included with a drive motor for changing a mounting angle of the second set of handlebars relative to the first set of handlebars and a second drive motor for changing a mounting distance of the second set of handlebars relative to the first set of handlebars.

In the illustrative application, the vehicle is a motorcycle and the vehicle controls includes a throttle, a brake and a clutch control. However, the invention may be used on bicycles, snowmobile, jet skis and other vehicles without limitation.

The disclosed system enables a new method for riding a vehicle including the steps of 1) gripping a first set of handlebars in a first riding position, the a first set of handlebars including a first grip mounted on a first side of the vehicle and a second grip mounted on a second side of the vehicle and 2) gripping a second set of handlebars in a second riding position, the second set of handle bars including a second set of handlebar grips mounted on the vehicle including a third grip mounted on the first side of the vehicle and a fourth grip mounted on the second side of the vehicle, the first and third grips being mounted in at least one position thereof in parallel, coplanar relation and the second and fourth grips being mounted in at least one position thereof in parallel, coplanar relation.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
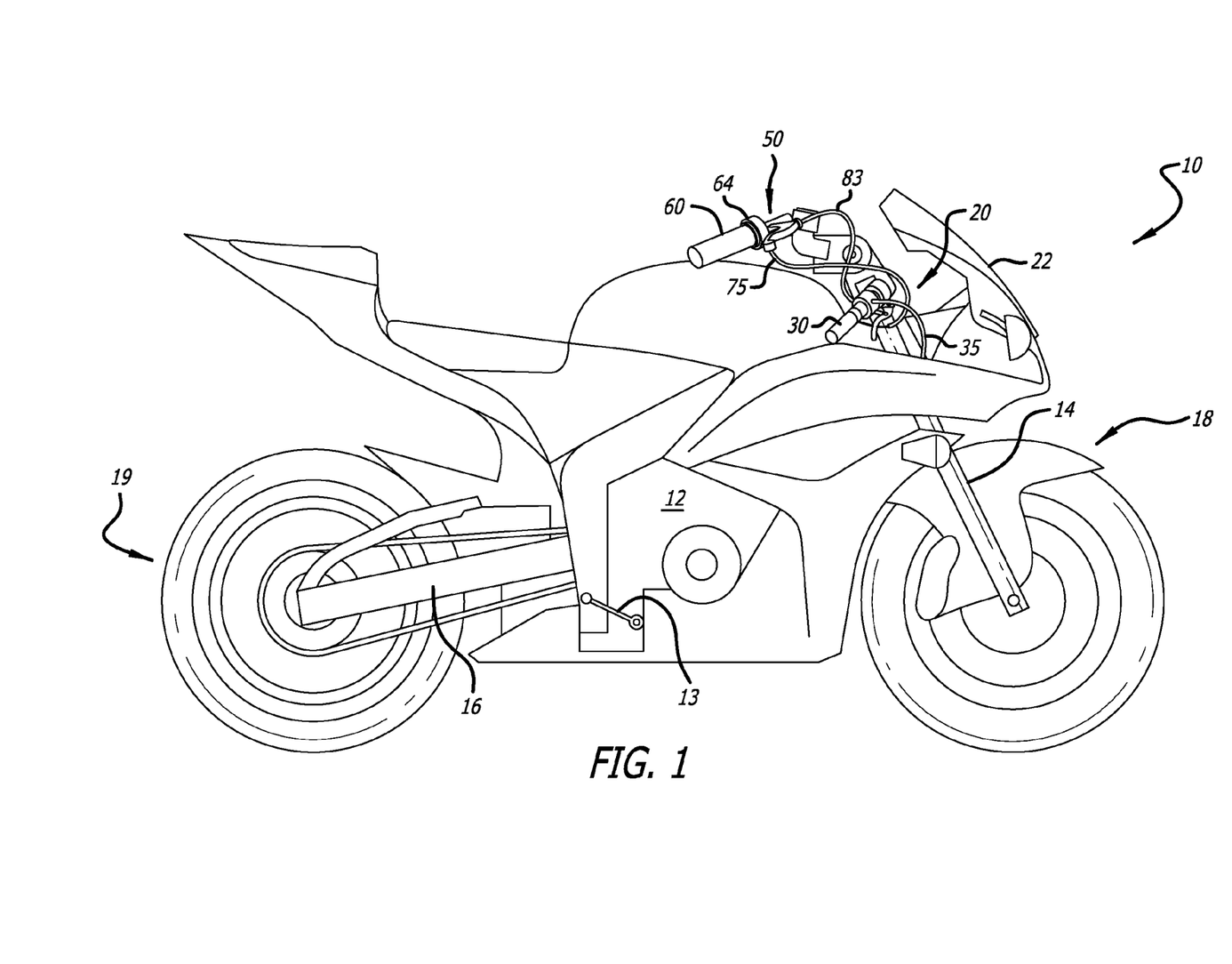
FIG. 1 is a side view of a motorcycle implemented in accordance with an illustrative embodiment of the present teachings.

FIG. 1 is a side view of a motorcycle 10 implemented in accordance with an illustrative embodiment of the present teachings. As shown in the figure, the motorcycle 10 has a chassis 12 having a front fork 14, 15 and a rear fork 16, 17. A wheel 18 is secured to the chassis 12 by the front fork 14, 15. In accordance with conventional teachings, a first set of handlebars 20 is mounted on the fork 14, 15. Clutch, brake and throttle controls are mounted on the first set of handlebars 20 as is common in the art.

Figure 2:
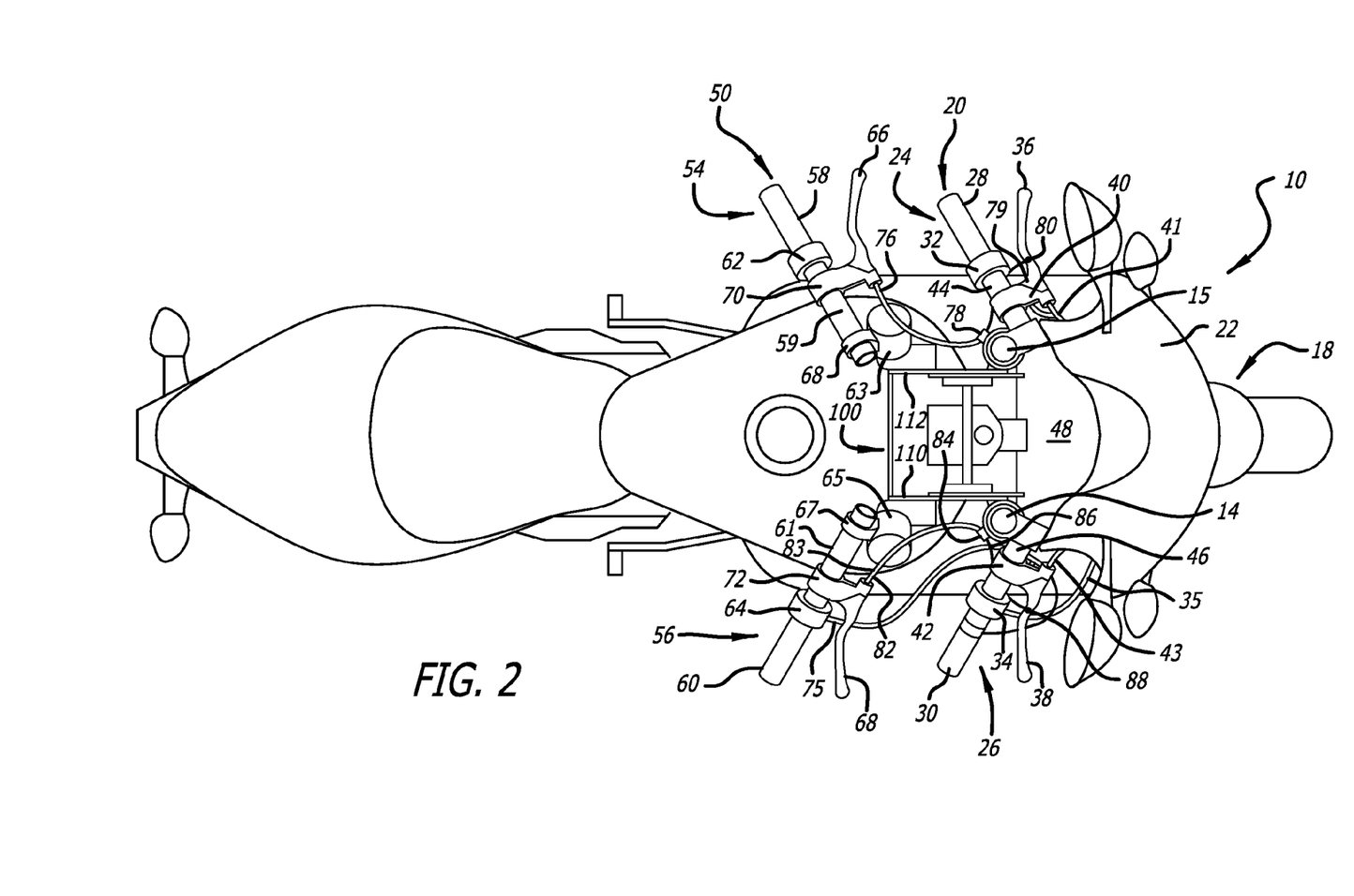
FIG. 2 is a top view of the motorcycle depicted in FIG. 1.

FIG. 2 is a top view of the motorcycle depicted in FIG. 1. As shown in FIG. 2, in accordance with the present teachings, a second set of handlebars 50 is mounted on the first fork 14, 15 such that the left and right grips thereof 58 and 60, respectively, in the nominal operating position, are substantially parallel and coplanar with the left and right grips 28 and 30, respectively, of the first set of handlebars 20.

As illustrated in FIG. 2, the first set of handle bars 20 includes left and right grip assemblies 24 and 26 respectively. The left grip assembly 24 includes a grip handle 28 and a collar 32, mounted on a bar 44. A clutch lever 36 is mounted to the bar 44 via a clutch housing 40. Actuation of the clutch lever 36 activates the clutch (not shown) of the motorcycle 10 in a conventional manner via clutch cable 41. Similarly, the right grip assembly 26 includes a throttle handle 30 and a throttle cable casing 34 mounted on a bar 46. The throttle handle actuates the throttle (not shown) via a cable 35. A front brake lever 38 activates the front brakes (not shown) of the motorcycle 10 in a conventional manner via a brake cable 43. The left and right bars 44 and 46, respectively, are mounted on the fork 14, 15 via a conventional triple tree 48.

As shown in FIG. 2, the second set of handle bars 50 includes left and right grip assemblies 54 and 56 respectively. The left grip assembly 54 includes a grip handle 58 and a collar 62, mounted on a bar 59. A clutch lever 66 is mounted to the bar 59 via a clutch housing 70. In the embodiment of FIG. 2, actuation of the clutch lever 66 activates the clutch (not shown) of the motorcycle 10 via a clutch cable 76 which is coupled to the clutch lever 36 of the left grip assembly 24 of the first set of handle bars 20.

The right grip assembly 56 of the second set of handlebars 50 includes a throttle handle 60 and a throttle cable casing 64 mounted on a bar 61. A front brake lever 68 activates the front brakes (not shown) of the motorcycle 10 via a brake cable 82 coupled to the brake lever 38 of the right grip assembly 26 of the first set of handle bars 20. The left and right bars 59 and 61, respectively, are mounted on the fork 14, 15 via a tilt and swivel, telescopic assembly 48 constructed in accordance with the teachings of copending patent application entitled SYSTEM AND METHOD FOR CONTINUOUSLY VARIABLE MOTORIZED ADJUSTMENT OF MOTORCYCLE HANDLEBARS, filed Feb. 3, 2014, P. Oravecz, the teachings of which are incorporated herein by reference.

Figure 3A:
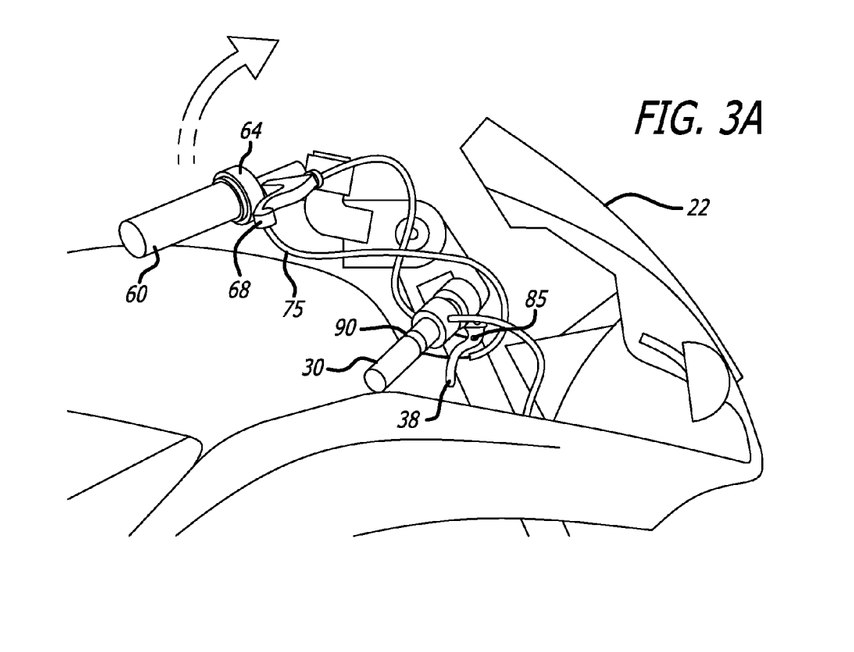
FIG. 3A is an isolated view of the right handle (throttle handle) of the first handlebar assembly.
Figure 3B:
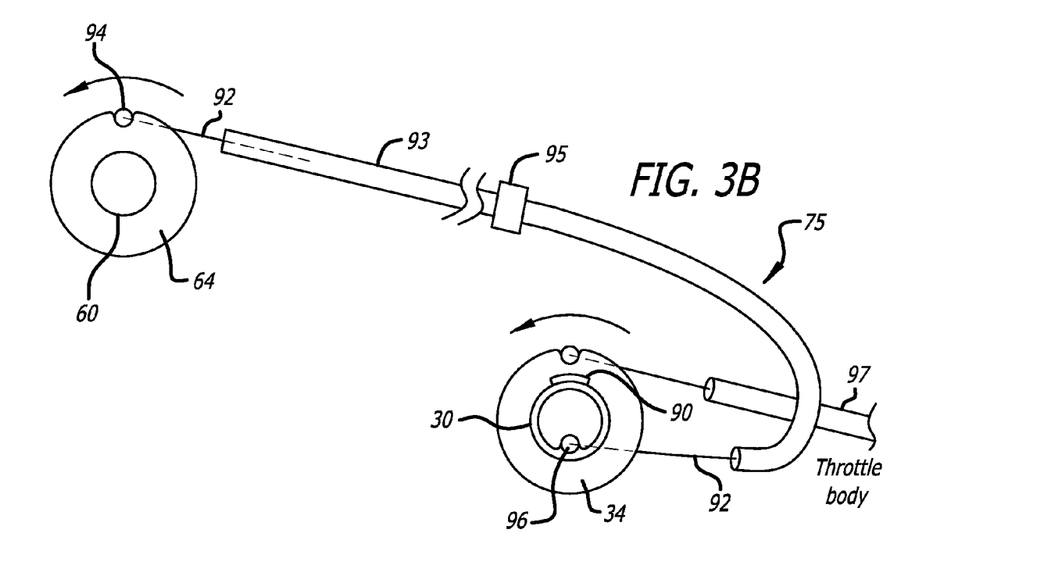
FIG. 3B is a schematic representation of the throttle connection between the upper and lower throttle handles and respectively.

FIGS. 3A and 3B illustrate the connections of the second set of controls to the first set of controls more clearly in accordance with a piggyback control embodiment.

FIG. 3A is an isolated view of the right handle (throttle handle) 30 of the first handlebar assembly 26.

FIG. 3B is a schematic representation of the throttle connection between the upper and lower throttle handles 30 and 60 respectively. These figures show the connection of a throttle cable 75 from the throttle handle 60 of the right grip assembly 56 of the second set of handlebars 50 to the throttle handle 30 of the right grip assembly 26 of the first set of handle bars 20. The proximal end of an inner wire, or core, connector 92 is connected to the upper throttle cable casing 64 at pin 94. The distal end of the connector 92 is connected to the throttle handle 30 of the right grip assembly 26 of the first set of handle bars 20 at a second pin 96. In the simple illustrative embodiment, the connection is effected via a strap 90. However, those of ordinary skill in the art will appreciate more elegant means for effecting this operational physical connection.

In any case, as shown in FIG. 3B, in the 'piggyback' arrangement of FIGS. 3, 3A and 3B, the cable 75 transfers counter-clockwise rotation of the second throttle handle 60 to counter-clockwise rotation of the first throttle handle 30 via translation of the inner wire 92 (FIG. 3B) of the cable 75 relative to the sheath 93. This relative translation is effected by restraint of the sheath 93 by a cable mount 95. The cable mount 95 is secures the sheath to the chassis 12. Rotation of the first throttle handle 30 actuates the throttle (not shown) in a conventional manner via a cable 97.

Figure 4:
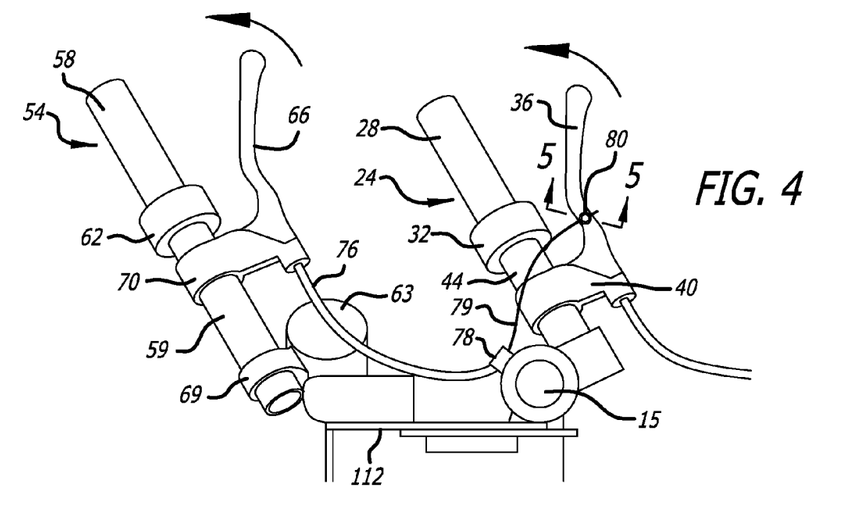
FIG. 4 is a partial top view that shows the left set of controls with the upper control in a pivoted position in accordance with the present teachings.

FIG. 4 shows the left upper grip in an upward swivel position in accordance with the direction depicted by the arrow. FIG. 4 also shows the interconnection of the upper and lower front clutch levers 66 and 36 by a cable 76. The proximal end of the cable 76 is connected to the upper clutch lever 66 such that actuation of the lever 66 causes the inner cable to move relative to the sheath thereof. The sheath is restrained against motion by a cable mount 78 secured to chassis 12. The distal end of the inner cable 76 is connected to the lower clutch lever 36 by a pin 80.

As depicted in FIGS. 2 and 4, similar interconnections are made between upper and lower clutch levers 66 and 36 via cable 76, mount 78 and pin 80 on lever 36.

Figure 5:
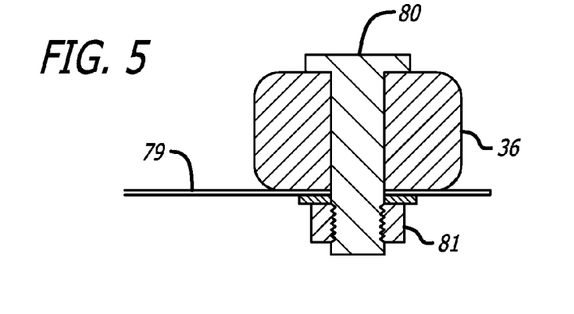
FIG. 5 is a sectional side view of an illustrative implementation of the pin provided to secure the clutch lever cable from the clutch lever of the second set of handlebars to the clutch lever of the first second of handlebars.

FIG. 5 is a sectional side view of an illustrative implementation of the pin 80 provided to secured the clutch lever cable from the clutch lever 66 of the second set of handlebars 50 to the clutch lever 36 of the first second of handlebars 20 in accordance with the present teachings.

The grip, casing, cables and cable sheaths used in the construction of the second set of handlebars may be of conventional construction. The second set of controls provided by the upper bars may be spring loaded or they may use the springs provided in the lower set of bars for actuation to the nominal (return) position.

Figure 6:
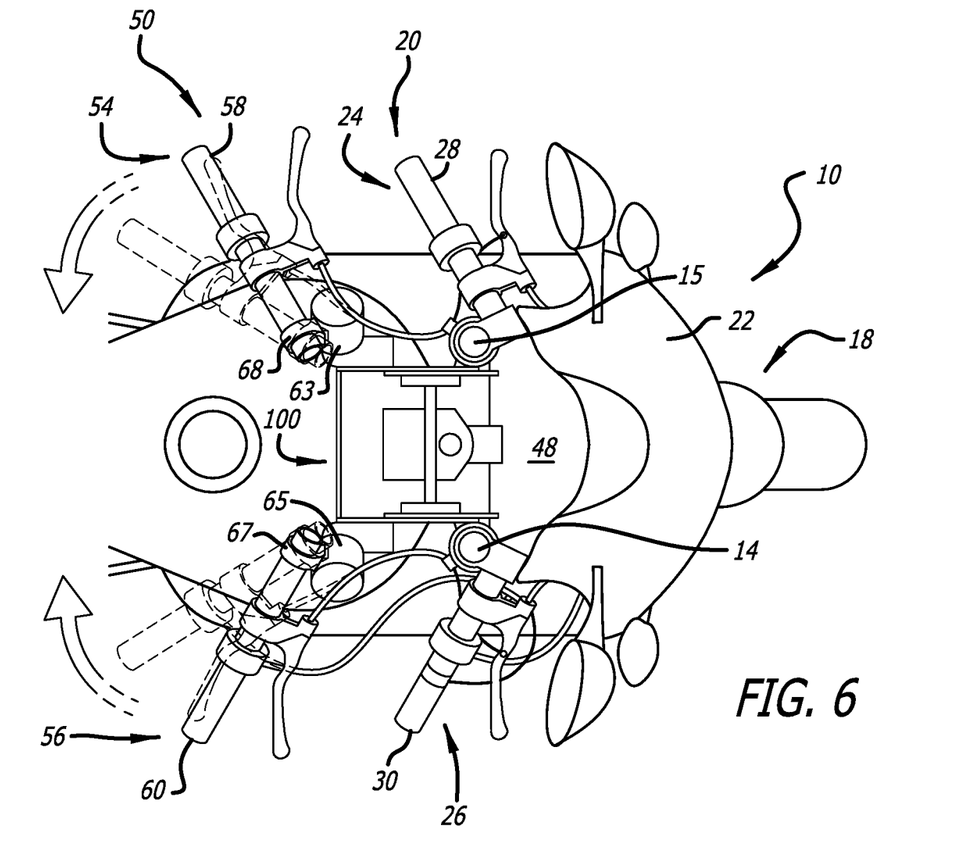
FIG. 6 is a diagram of an illustrative mounting arrangement for the second set of handle bars in accordance with the disclosed invention.

FIG. 6 is a diagram of an illustrative mounting arrangement for the second set of handle bars in accordance with the disclosed invention. As shown in FIG. 6, the first and second grips on the second set of handlebars may be pivoted about joints 63 and 65, respectively. The joints 63 and 65 may be bolts, in the most simple implementation, that are loosened and tightened with a wrench.

Figure 7:
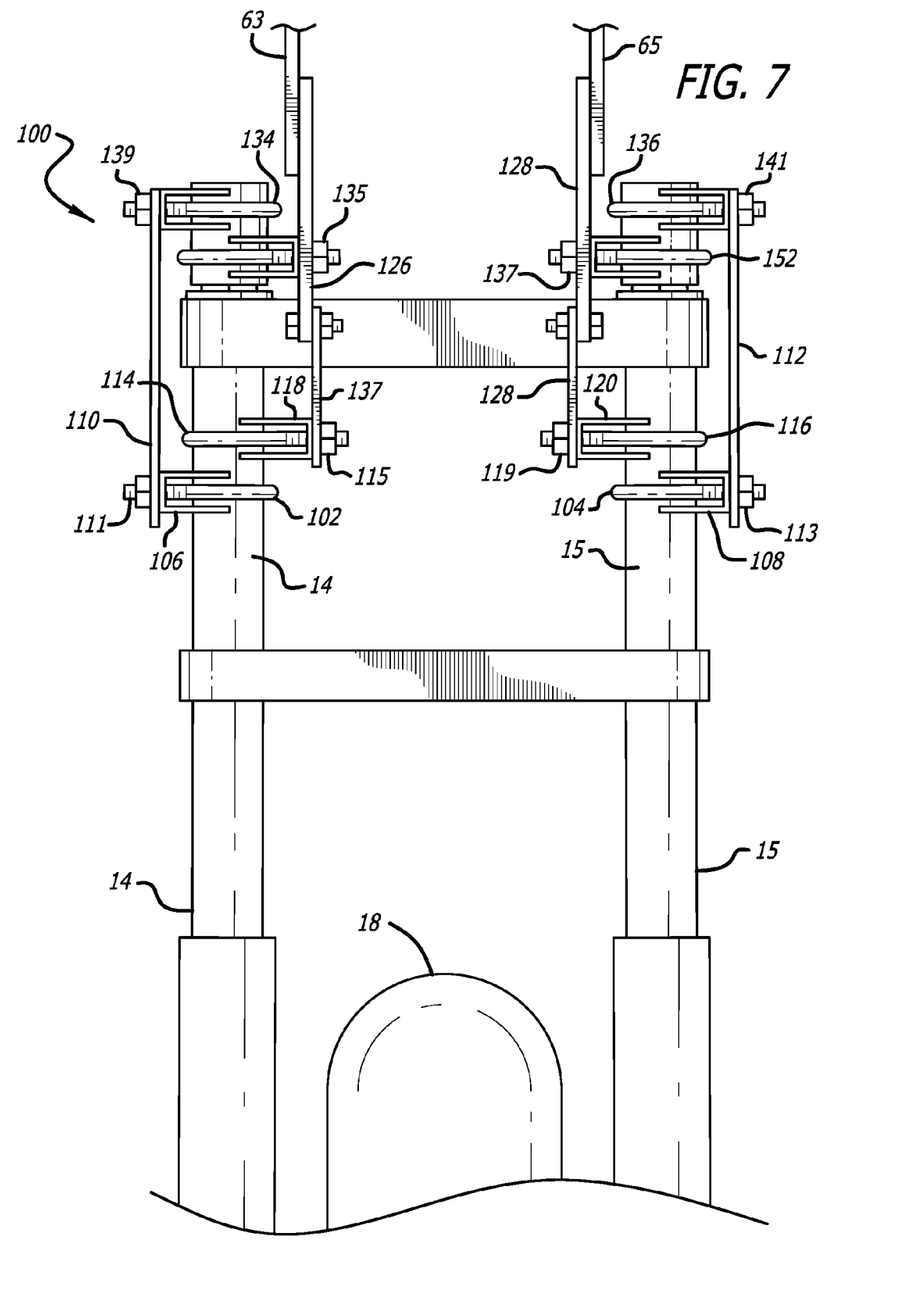
FIG. 7 is a front view of an illustrative embodiment of a mounting arrangement for use with the present invention.

FIG. 7 is a front view of an illustrative embodiment of a mounting arrangement for use with the present invention. As shown in FIG. 7, in the best mode, the mounting arrangement is implemented in accordance with the teachings of the above-referenced, copending patent application entitled SYSTEM AND METHOD FOR CONTINUOUSLY VARIABLE MOTORIZED ADJUSTMENT OF MOTORCYCLE HANDLEBARS, filed Feb. 3, 2014, P. Oravecz, the teachings of which are incorporated herein by reference.

The second set of handlebars 50 have been disclosed above with reference to a serial or piggyback arrangement by which the second set of handlebars operate through the first set of handlebars 20.

Figure 8:
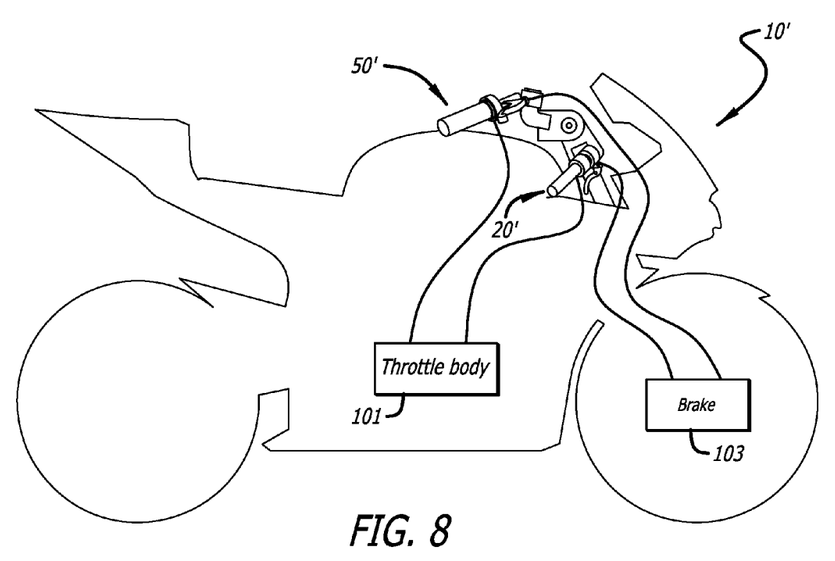
FIGS. 8 and 9 are schematic diagrams that show an alternative embodiment in which the second set of bars operates in a parallel manner relative to the first set of bars.
Figure 9:
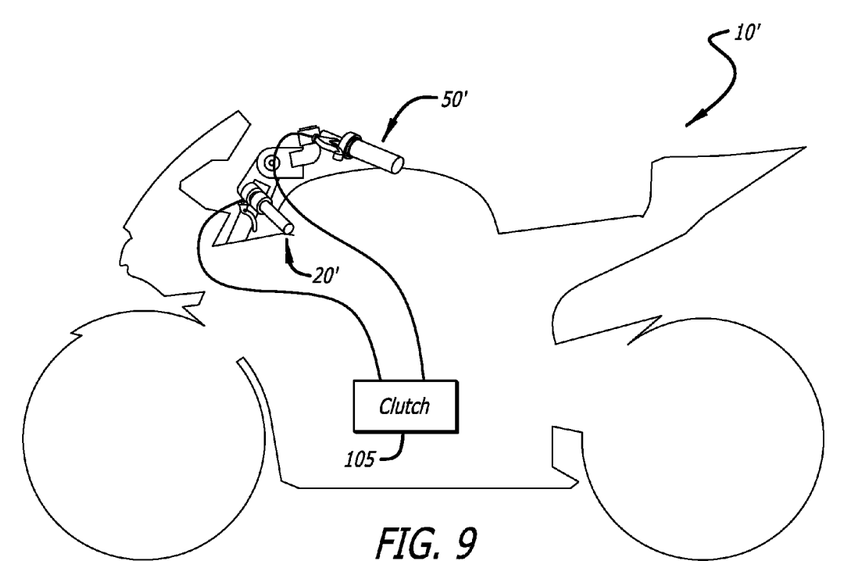

FIGS. 8 and 9 are schematic diagrams that show an alternative embodiment in which the second set of bars 50 operate in a parallel manner relative to the first set of bars 20. In this embodiment, the second set of bars 50 make direct connection to the throttle 101, brake 103 and clutch 105 of the vehicle 10'.

Figure 10:
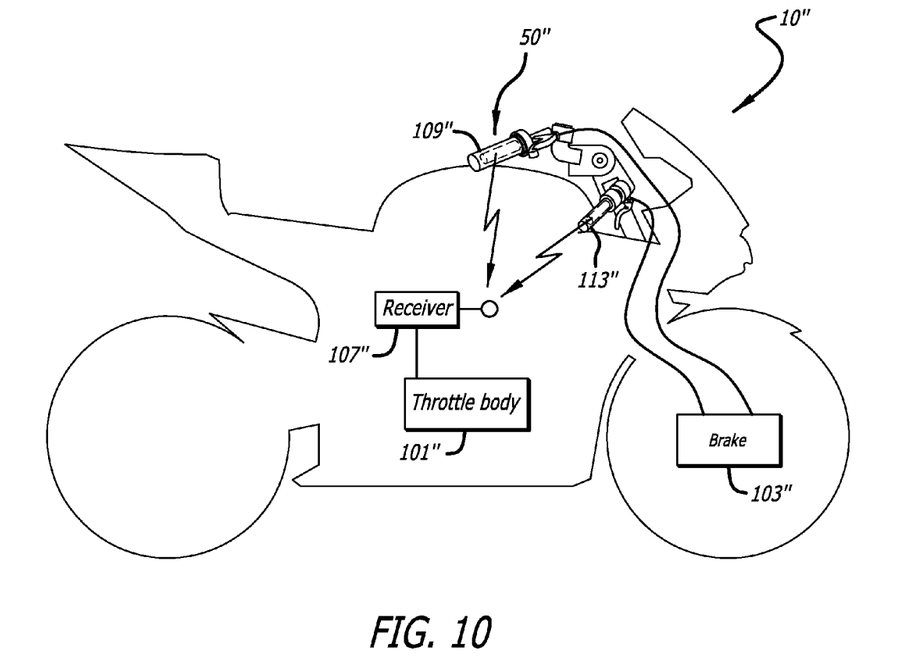
FIG. 10 is a schematic diagram that shows yet another embodiment in which the second set of bars connect to the throttle, brake and clutch (not shown) via a wireless receiver.

FIG. 10 is a schematic diagram that shows yet another embodiment in which the second set of bars 50 connect to the throttle 101", brake 103" and clutch (not shown) via a wireless receiver 107". This requires the integration of a conventional wireless active or passive transmitter 109" and 111" (not shown) in each grip of the second set of bars 50". In addition, the first set of bars 20" may be equipped with active or passive transmitters 113" and 115" (not shown) as well.

Thus, the present invention has been described herein with reference to a particular embodiment for a particular application. Those having ordinary skill in the art and access to the present teachings will recognize additional modifications, applications and embodiments within the scope thereof. For example, the present invention is not limited to use on motorcycles. Those of ordinary skill in the art will appreciate that the present invention can be used on any vehicle having a steering control such as a bicycle, snow mobile, jet ski or other vehicle with handlebars. Further, the invention is not limited to use on vehicles with handlebars. That is, the present teachings may be used on a vehicle with a single stalk steering control. Those of ordinary skill in the art will also appreciate that the invention is not limited to the use of electric motors as actuators. Hydraulic, pneumatic and/or solenoid actuators may be used as well. The remote control could be voice activated and helmet mounted.

It is therefore intended by the appended claims to cover any and all such applications, modifications and embodiments within the scope of the present invention.

The invention claimed is:

1. A steering control system for a vehicle having a chassis and a movable steering mechanism, said steering mechanism including a fork having a longitudinal axis, for retaining a wheel or a ski at a distal end thereof, mounted on said chassis comprising:
   a first set of handlebar grips mounted on said fork at a proximal end thereof, wherein the first set of handlebar grips are mounted on a first set of handlebars; the first set of handlebars comprises a first bar and a second bar; the first set of handlebar grips comprises a first grip mounted on a first side of the vehicle on the first bar, and the first set of handlebar grips comprises a second grip mounted on a second side of the vehicle on the second bar; a first set of controls mounted on said first set of handlebars;
   wherein a second set of handlebar grips are mounted on a second set of handlebars; the second set of handlebars comprises a third bar and a fourth bar; the second set of handlebar grips comprises a third grip mounted on the first side of the vehicle on the third bar, and the second set of handlebar grips comprises a fourth grip mounted on the second side of the vehicle on the fourth bar, said third bar being mounted for rotation about a first axis and a second axis independently relative to said fourth bar and said fourth bar being mounted for rotation about said first axis and a third axis independently relative to said third bar;
   a second set of controls mounted on said second set of handlebars, wherein said first and second set of controls are identical; and
   an arrangement for changing mounting angles of said second set of handlebar grips relative to said first set of handlebar grips.

2. The invention of claim 1 wherein the second set of controls is coupled to the first set of handlebars.

3. The invention of claim 2 wherein the second set of controls is coupled through the first set of handlebars.

4. The invention of claim 1 wherein the vehicle is a motorcycle and the first and second vehicle controls includes a throttle, a brake and a clutch control.

5. The invention of claim 1 wherein the vehicle is a bicycle.

6. The invention of claim 1 wherein the vehicle is a snowmobile.

7. The invention of claim 1 wherein the vehicle is a jet ski.

8. A vehicle control system comprising:
   a first set of handlebar grips, on a first set of handlebars, including a first grip mounted on a first side of the vehicle, a second grip mounted on a second side of the vehicle and a first set of vehicle controls;
   a second set of handlebar grips mounted on the vehicle, on a second set of handlebars, including a third grip mounted on the first side of the vehicle, a fourth grip mounted on the second side of the vehicle and a second set of controls; the second set of controls being coupled to the first set of controls, said third grip being mounted for rotation about a first axis and a second axis independently relative to said first set of handlebar grips and said fourth grip and said fourth grip being mounted for rotation about said first axis and a third axis independently relative to said first set of handlebar grips and said third grip; and
   a first arrangement for changing a mounting angle of the second set of handlebar grips relative to the first set of handlebar grips and a second arrangement for changing a mounting distance of the second set of handlebars relative to the first set of handlebars.

9. A method for riding a vehicle having a chassis and a movable steering mechanism, said steering mechanism including a fork having a longitudinal axis, for retaining a wheel or a ski at a distal end thereof, mounted on said chassis including the steps of:
   gripping a first set of handlebar grips in a first riding position, the first set of handlebar grips being mounted on a first set of handlebars on said fork at a proximal end thereof, said first set of handlebar grips including a first grip mounted on a first side of the vehicle on a first bar and a second grip mounted on a second side of the vehicle on a second bar; and
   gripping a second set of handlebar grips in a second riding position, the second set of handlebar grips being mounted on a second set of handlebars on said fork at the distal end thereof, said second set of grips including a third grip mounted on the first side of the vehicle on a third bar closer to the distal end of said fork relative to said first bar and a fourth grip mounted on the second side of the vehicle on a fourth bar closer to the distal end of said fork relative to said second bar, said third bar being mounted for rotation about a first axis and a second axis independently relative to said fourth bar and said fourth bar being mounted for rotation about said first axis and a third axis independently relative to said third bar, whereby the first and third grips are mounted in at least one position thereof in a parallel, coplanar relation and the second and fourth grips are mounted in at least one position thereof in a parallel, coplanar relation;

selectively changing a mounting angle of the first set of handlebar grips relative to the second set of handlebar grips with a first arrangement and selectively changing a mounting distance of the second set of handlebars relative to the first set of handlebars with a second arrangement.

* * * * *